Sept. 25, 1951 V. J. DUKE ET AL 2,569,297

DIRECT CURRENT RESTORING APPARATUS

Filed Dec. 16, 1948

Inventors
Vernon J. Duke and
Andrew L. Hammerschmidt
BY [signature]
ATTORNEY

Patented Sept. 25, 1951 2,569,297

UNITED STATES PATENT OFFICE 2,569,297

DIRECT-CURRENT RESTORING APPARATUS

Vernon J. Duke, Rockville Centre, N. Y., and Andrew L. Hammerschmidt, Berea, Ohio, assignors to Radio Corporation of America, a corporation of Delaware Application December 16, 1948, Serial No. 65,546

3 Claims. (Cl. 178—7.3)

The present invention relates to circuits for reinserting or restoring the direct current component of an electric signal and finds particular application, although not limited thereto, to television receiving and transmitting systems.

Numerous circuits have been proposed for reinserting the direct current component of the television signal by taking advantage of the fact that after the D. C. component is removed, the height of the synchronizing pulses as measured from the alternating current axis of the composite signal (picture signal plus synchronizing pulses and blank-out pulses) may be made to correspond to the missing D. C. component. In the cases where D. C. reinsertion is accomplished in the grid circuit of a vacuum tube adapted to translate sync positive picture signals, certain inefficiencies sometimes arise which have in the past been tolerated. One of the major inefficiencies arises from the fact that the vacuum tube involved must be disposed for safe operation under conditions of no signal while on the other hand takes advantage of the largest possible section of its grid plate transfer characteristic while passing a signal. The former consideration usually results in restricting the plate current of the tube under conditions of no signal which, in most instances, makes necessary a considerable sacrifice in the range of the signal amplitude range permissibly applied to the tube due to curvature of the transfer characteristics around the grid cut-off potential region.

The present invention when applied to vacuum tubes accomplishing D. C. reinsertion in their input circuits affords means for biasing the vacuum tube to a safe value of operating current under conditions of no signal while permitting this bias potential to be exceeded in a positive direction up to a conventional limiting threshold, which by novel circuitry is established at a discrete level more positive than the static operating bias of the vacuum tube. This therefore allows a greater range of vacuum tube grid transfer characteristic to be utilized and hence affords considerable circuit economies.

It is therefore an object of the present invention to provide a simple direct-current reinsertion system for alternating current signals which allows optimum use of vacuum tube characteristics.

It is another object of the present invention to provide a particularly efficient D. C. reinsertion system for television system.

It is another purpose of the present invention to provide an improved form of signal clamping circuit for positively extending signals wherein the clamping level may be established substantially above the most allowably positive static operating bias for an associated vacuum tube.

Other objects and advantages of the present invention, in addition to those appearing hereinbefore, as well as the detailed knowledge of its operation will be discerned through the perusal of the following specification, especially when considered in connection with the accompanying drawings in which.

Figure 1:
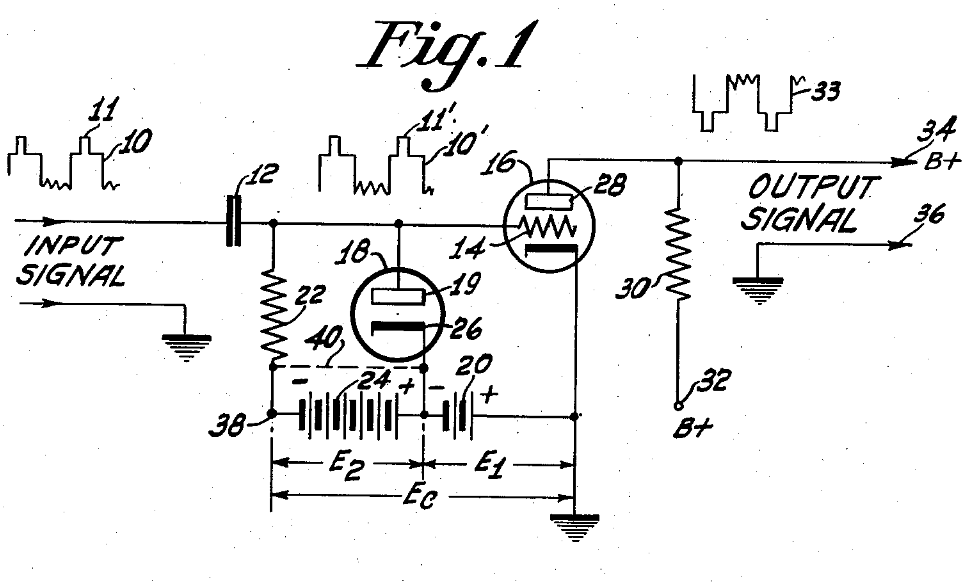
Figure 1 illustrates one form of the present invention.

Referring now to Figure 1, there is illustrated a D. C. reinsertion circuit incorporating the present invention. An input signal 10 presumably containing a D. C. component is coupled through capacitor 12 to the grid 14 of vacuum tube 16. It will be appreciated that the waveform 10' applied to the grid 14 after having passed through the condenser 12 will no longer contain a D. C. component as such. To restore the D. C. component to the waveform 10' a diode, such as 18, may be connected from the control grid 14 to a source of bias potential 20 of potential $E_1$. A load resistor 22 may then be provided from the grid 14 to a source of negative potential 24 having its positive terminal connected with a cathode 26 of diode 18. Anode 28 of the vacuum tube 16 is then connected through load resistor 30 to a source of positive potential having a terminal at 32. The output signal, with the D. C. reinserted, is then available at terminals 34 and 36.

It will be recognized that the circuit of Figure 1 differs from prior art circuits of similar nature in the respect that the cathode 26 of the diode 18 is returned to a point more positive than the load resistor 22. Under these prior art conditions wherein the cathode 26 would be fixed to terminal 38 of battery 24 as indicated by dotted line 40, it will be evident to those skilled in the art that the positive sync peaks 11' of waveform 10' will be clamped to a voltage level equal to $E_c$ as indicated on the grid plate characteristic of Figure 3.

Figures 2, 3:
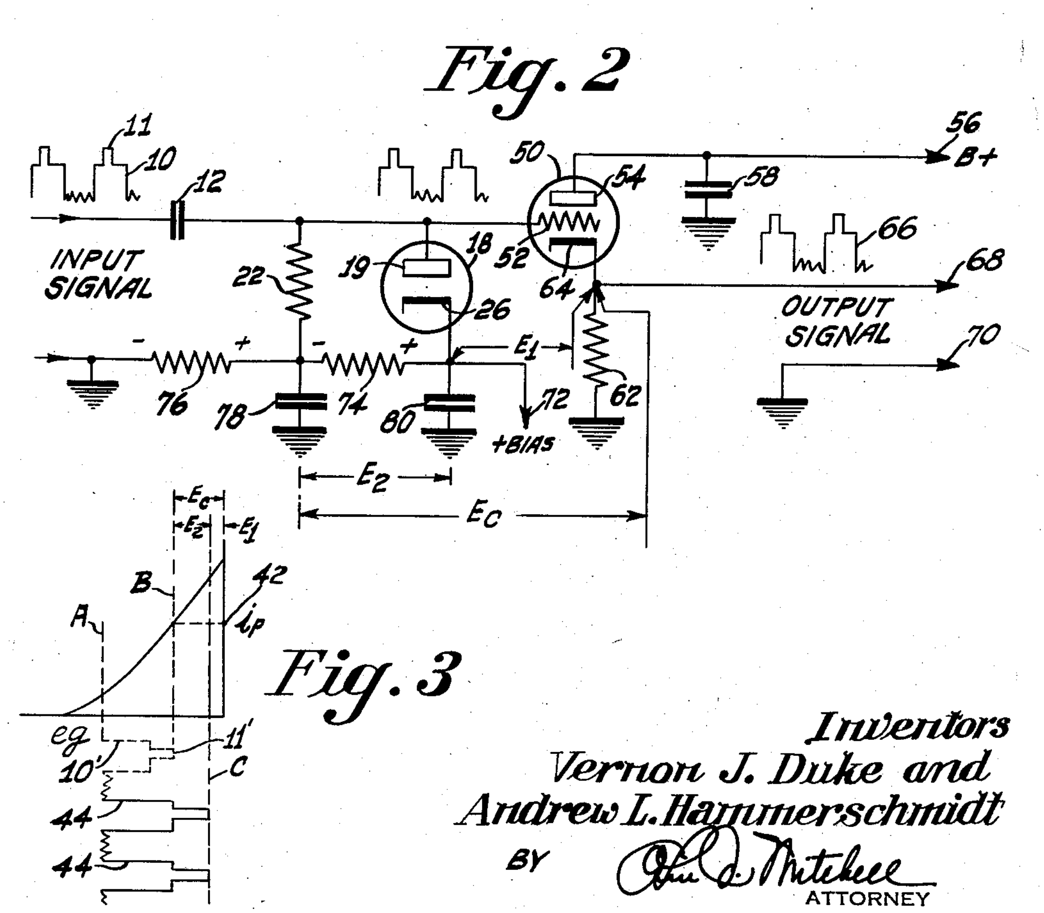
Figure 2 illustrates another form of the present invention.
Figure 3 is a typical grid transfer characteristic of a triode vacuum tube with certain operating conditions depicted thereon which are peculiar to the present invention.

As shown in Figure 3, and still considering prior art operation if the input signal 10' is to be amplified with no appreciable distortion and proper D. C. reinsertion to be accomplished, the amplitude range of the signal 10′ will have to be limited to approximately the amplitude defined between dotted line A and dotted line B on the transfer characteristic. It is to be understood that the value of the operating bias $E_c$, at which dotted line B is established, has been chosen to allow maximum permissible plate current in the vacuum tube 16 under no signal conditions as indicated by the value at 42. Therefore with this arrangement, the peak output voltage of the amplifier stage 16 is limited by the maximum permissible static plate current under no signal conditions. The only way in which greater permissible signal input with a consequent greater signal output could be realized with the prior art connections shown by dotted line 40 would be to decrease the absolute value of voltage $E_c$ and thereby move the clamping level represented by dotted line B in a positive direction. This, of course, would result in a higher peak plate current corresponding to the positive peak 11′ of sync. But although this value of peak plate current could be handled by the vacuum tube 16 on an instantaneous basis, discontinuance of signal input would establish a static operation condition in the vacuum tube 16 at this peak plate current and hence cause injury to the tube. Consequently, the range in which the vacuum tube 16 may be operated as a D. C. reinsertion stage is substantially limited to that shown between dotted lines A and B.

According to the present invention, this range may be extended by the connections shown in solid line of Figure 1 wherein the cathode 26 is returned to a point more positive than that to which the grid 14 is returned. Looking to Figure 3 then, we see under normal operating conditions the grid 14 will be biased to the safe operating value $E_c$ with the permissible static plate current of value 42. However, through this connection the anode 19 of the diode 18 is made negative with respect to the cathode 26 by the potential $E_2$ of potential source 24. This means that the diode 18 will not conduct until the sync peak 11′ drives the grid 14 to a potential $E_2$ volts positively in excess of $E_c$ and hence the circuit will clamp at this higher voltage. Clamping action in accordance with this operation will then permit a greater amplitude of input signal to be applied such as that shown at 44 in Figure 3. Here the peak of sync now clamps to a negative voltage equal to $E_1$, shown by dotted line C, which as described is $E_2$ volts more positive than $E_c$. Hence, the permissible range of operation for the vacuum tube has been extended from limited range between dotted lines A and B to the extended range between dotted lines A and C. This results in a much larger available output signal from the vacuum tube 16.

The arrangement shown in Figure 2 applies the principle of Figure 1 to the vacuum tube 50 connected as a cathode follower amplifier. As before the signal 10 with the positive sync peaks 11 is coupled through a capacitor 12 to the grid 52 of the vacuum tube 50. The anode 54 of the vacuum tube 50 is connected directly to a positive power supply terminal 56 with capacitor 58 establishing the anode at A. C. ground potential. A cathode follower load resistor 62 is connected from the cathode 64 to ground potential thereby allowing the output signal 66 with proper D. C. reinsertion to be available across terminals 68 and 70. For the clamping action, the diode 18 has its anode 19 connected with the grid 52 and its cathode 26 connected with a source of positive bias potential 72. The value of the bias potential 72 is chosen such that diode-cathode 26 is negative with respect to the vacuum tube cathode 64 by an amount equivalent to $E_1$ of Figure 1. The absolute value of bias potential 72 will therefore depend upon the self-biasing voltage drop across resistor 62. According to the operation of Figure 1, the grid 52 should then be returned through load resistor 22 to a potential negative with respect to the diode-cathode 26. This may be accomplished by placing a voltage divider system comprising resistors 74 and 76 across the positive bias terminal 72 to ground, suitable by-pass condensers 78 and 80 being provided in a conventional manner. The bleeder resistors 74 and 76 should then be proportioned such that the voltage drop across resistor 74 is equivalent to the potential $E_2$ of Figure 1. Under these conditions then, the operation will be as shown in Figure 3. For no signal input the plate current of the vacuum tube 50 will be established at a level 42 of Figure 3 produced by the sum $E_c$ of voltages $E_1$ and $E_2$, whereas the peaks of sync will be clamped to a level $E_1$ which is positive with respect to $E_c$ by an amount equal to $E_2$, thus providing an expanded operational range for the vacuum tube 50 over and above conventional systems.

From the foregoing it is seen that the present invention provides a simple, economical and efficient D. C. reinsertion system which finds particular application to television circuits and permits appreciably greater operational range to be realized from vacuum tubes when applied to such types of circuits than heretobefore allowed.

We claim:

1. In a television signal translating system for translating a signal including a combined picture component and synchronizing component having amplitude values outside the amplitude range of the picture components, the background illumination of the picture being represented by the peak value of the signal on one side of its A. C. axis, a D. C. reinsertion arrangement for accepting the A. C. version of said signal and producing an output signal containing a D. C. component in accordance with the picture background illumination, said arrangement comprising in combination, a variable conductance device having at least a cathode and a control electrode, a resistance connected between said conduction device cathode and a reference potential, a capacitor connected between said control electrode and a source of input signal, a source of unidirectional potential having a positive polarity with respect to said reference potential, a bleeder resistance connected from said unidirectional potential source to said reference potential, said bleeder having a first and a second tap thereon, said first tap making available a potential relative to said reference potential positively in excess of that made available at said bleeder second tap, a unilateral conduction device having an anode and a cathode, a connection from said unilateral conduction device anode to said variable conduction device control electrode, a connection from said unilateral conduction device cathode to said bleeder first tap, and an impedance connected from said variable conduction device control electrode and said bleeder second tap.

2. Apparatus according to claim 1 wherein said bleeder second tap is adjusted to provide a proper static operating bias for said conduction device and wherein said first bleeder tap is adjusted to limit positive excursions of said control electrode to values substantially in excess of said static operating bias established by said second tap such that the positive peak potential excursions of said control electrode are considerably more positive than the maximum permissible positive static operating bias.

3. In a television signal translating system for translating a signal including a combined picture component and synchronizing component having amplitude values outside the amplitude range of the picture components, the background illumination of the picture being represented by the peak value of the signal on one side of its A. C. axis, a D. C. reinsertion arrangement for accepting the A. C. version of said signal and producing an output signal containing a D. C. component in accordance with the picture background illumination, said arrangement comprising in combination, a variable conductance device having at least a cathode, an anode and a control electrode, means connecting said cathode to a reference potential, means connecting said anode to a source of high potential, a capacitor connected between said control electrode and a source of input signal, a source of unidirectional potential having a positive polarity with respect to said reference potential, a bleeder resistance connected from said unidirectional potential source to said reference potential, said bleeder having a first and a second tap thereon, said first tap making available a potential relative to said reference potential positively in excess of that made available at said bleeder second tap, a unilateral conduction device having an anode and a cathode, a connection from said unilateral conduction device anode to said variable conduction device control electrode, a connection from said unilateral conduction device cathode to said bleeder first tap, and an impedance connected from said variable conduction device control electrode and said bleeder second tap.

VERNON J. DUKE.
ANDREW L. HAMMERSCHMIDT.

REFERENCES CITED

The following references are of record in the file of this patent:

UNITED STATES PATENTS

| Number | Name | Date |
|---|---|---|
| 2,144,995 | Pulvari-Pulvermacher | Jan. 24, 1939 |
| 2,240,500 | Applegarth, Jr. | May 6, 1941 |
| 2,255,691 | Wilson | Sept. 9, 1941 |
| 2,298,809 | Phea | Oct. 13, 1942 |
| 2,315,388 | Bedford | Mar. 30, 1943 |

FOREIGN PATENTS

| Number | Country | Date |
|---|---|---|
| 48,926 | Denmark | June 25, 1934 |